United States Patent
Xie

(10) Patent No.: US 11,906,103 B1
(45) Date of Patent: Feb. 20, 2024

(54) LIFTABLE TELEVISION FLOOR STAND

(71) Applicant: Cheng-Xin Xie, Tainan (TW)

(72) Inventor: Cheng-Xin Xie, Tainan (TW)

( * ) Notice: Subject to any disclaimer, the term of this patent is extended or adjusted under 35 U.S.C. 154(b) by 0 days.

(21) Appl. No.: 18/176,675

(22) Filed: Mar. 1, 2023

(51) Int. Cl.
*F16M 11/28* (2006.01)
*F16M 11/08* (2006.01)

(52) U.S. Cl.
CPC ............. *F16M 11/28* (2013.01); *F16M 11/08* (2013.01); *F16M 2200/021* (2013.01)

(58) Field of Classification Search
CPC .. F16M 11/28; F16M 11/08; F16M 2200/021; F16M 11/42; F16M 11/045; A47B 2200/0023; H04N 1/00562
USPC .................. 248/161, 917, 919–923
See application file for complete search history.

(56) References Cited

U.S. PATENT DOCUMENTS

| | | | | |
|---|---|---|---|---|
| 3,790,119 | A * | 2/1974 | Bauer | A47C 3/30 248/161 |
| 6,095,476 | A * | 8/2000 | Mathis | F16M 11/10 248/371 |
| 11,396,972 | B1 * | 7/2022 | You | F16M 11/046 |
| 2004/0004165 | A1 * | 1/2004 | Hong | F16M 11/28 248/132 |
| 2007/0252919 | A1 * | 11/2007 | McGreevy | F16M 11/28 348/825 |
| 2009/0050757 | A1 * | 2/2009 | Oh | F16M 11/10 248/205.1 |
| 2021/0190257 | A1 * | 6/2021 | You | F16M 11/16 |

FOREIGN PATENT DOCUMENTS

| | | |
|---|---|---|
| JP | 3202140 U | 1/2016 |
| JP | 2020136758 A | 8/2020 |
| JP | 6865495 B2 | 4/2021 |
| JP | 6867075 B1 | 4/2021 |

* cited by examiner

*Primary Examiner* — Christopher Garft
(74) *Attorney, Agent, or Firm* — Rosenberg, Klein & Lee

(57) ABSTRACT

A liftable television floor stand including a support bracket, a cylinder, and an assembly bracket is provided. An outer support tube is disposed on a base of the support bracket and having an inner support tube moveably mounted therein. The cylinder is disposed in the outer support tube and fixed on the base. An upper end of an output shaft of the cylinder is fixed on an upper end of the inner support tube which is provided with a control member for control of movement of the output shaft. A rotating shaft of the assembly bracket is connected with a top end of the inner support tube by a sleeve so that the assembly bracket can be rotated around the rotating shaft. A front end of the assembly bracket is connected with a back surface of a television. Thereby height and angle adjustment is achieved conveniently.

5 Claims, 6 Drawing Sheets

LIFTABLE TELEVISION FLOOR STAND

BACKGROUND OF THE INVENTION

Field of the Invention

The present invention relates to a television floor stand, especially to a liftable television floor stand which not only can be adjusted to a required height quickly and conveniently in a stepless manner without using additional tools, a television mounted thereon can also be rotated to optimal reviewing angle or direction conveniently according to users' needs.

Description of Related Art

No matter at home, public places, or shops, various types of television (TV) stands are commonly used for mounting and positioning televisions so that people can see programs on the television conveniently.

Refer to Japanese Utility Model No. 3202140 (U) published on Jan. 21, 2016 "television stand", Japanese Pat. Pub. No. 2020136758 (A) "support" published on Aug. 31, 2020, Japanese granted patent No. 6867075 (B1) "support" published on Apr. 28, 2021, and Japanese granted patent No. 6865495 (B2) "support" published on Apr. 28, 2021, these television supports and stands revealed are all floor-standing for mounting and fixing televisions. Threaded members are inserted into threaded holes with different heights arranged at a support bracket to adjust height of the television while in use.

Although the above television supports and stands can not only mount and hold the television but also provide height adjustment of the television, such designs have the following shortcomings while in use.

1. Owing to the use of the threaded members inserted into the threaded hole for height adjustment of the television supports and stands, tools are required for rotating the respective threaded members during the height adjustment and this is inconvenient for users.
2. The above structure only allows the television to be adjusted vertically and the television is unable to be rotated for adjustment of a viewing angle. Thereby the user needs to rotate the whole television supports and stands for adjusting the viewing angle. The adjustment process is not convenient.

Thus there is room for improvement and there is a need to provide a novel liftable television floor stand which is more convenient to use.

SUMMARY OF THE INVENTION

Therefore, it is a primary object of the present invention to provide a liftable television floor stand which not only can be adjusted to a required height quickly and conveniently in a stepless manner without using additional tools, a television mounted thereon can also be rotated to optimal reviewing angle or direction conveniently according to users' requirements.

In order to achieve the above objects, a liftable television floor stand according to the present invention mainly includes a support bracket, a cylinder, and an assembly bracket.

The support bracket consists of a base on a bottom thereof, an outer support tube disposed on an upper end of the base, and an inner support tube moveably mounted in the outer support tube.

The cylinder is disposed inside the outer support tube of the support bracket and a bottom of the cylinder is fixed and connected with the base.

An upper end of an output shaft of the cylinder is disposed on an upper end of the inner support tube while a control member is arranged at the upper end of the inner support tube and corresponding to the output shaft. A control part is formed on a top end of the output shaft and the control member is provided with a press part corresponding to the control part. The control member pushes the control part to move by the press part for control of movement of the output shaft of the cylinder.

The assembly bracket includes a rotating shaft disposed on a bottom thereof and a sleeve by which the rotating shaft is connected with a top end of the inner support tube of the support bracket. Thus the assembly bracket can be rotated around the rotating shaft. A front end of the assembly bracket is fixed and connected with a back surface of the television.

Preferably, the cylinder is an air cylinder.

Preferably, the cylinder is a hydraulic cylinder.

Preferably, the output shaft of the cylinder is used for height adjustment within a travel of 35 centimeters (cm).

Preferably, the assembly bracket can be rotated 15 degrees around the rotating shaft clockwise and counterclockwise.

Preferably, the sleeve of the assembly bracket is provided with a locking member able to be fastened with the inner support tube of the support bracket. Thereby the assembly bracket is unable to be rotated anymore when the sleeve is fastened with the inner support tube by the locking member.

Preferably, a plurality of assembly grooves is disposed on the front end of the assembly bracket for mounting assembly rods each of which is provided with a plurality of assembly holes and a plurality of assembly members. Thereby positions of the assembly rods are adjustable and the assembly rods are mounted into the corresponding assembly grooves according to a size of a television. By the assembly members inserted through the assembly holes correspondingly, the assembly rods are fixed and connected with the back surface of the television.

Preferably, the assembly bracket includes at least two positioning members for positioning the assembly rods to prevent the assembly rods from sliding freely in the assembly grooves.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions with the figures and reference signs.

Figure 1:
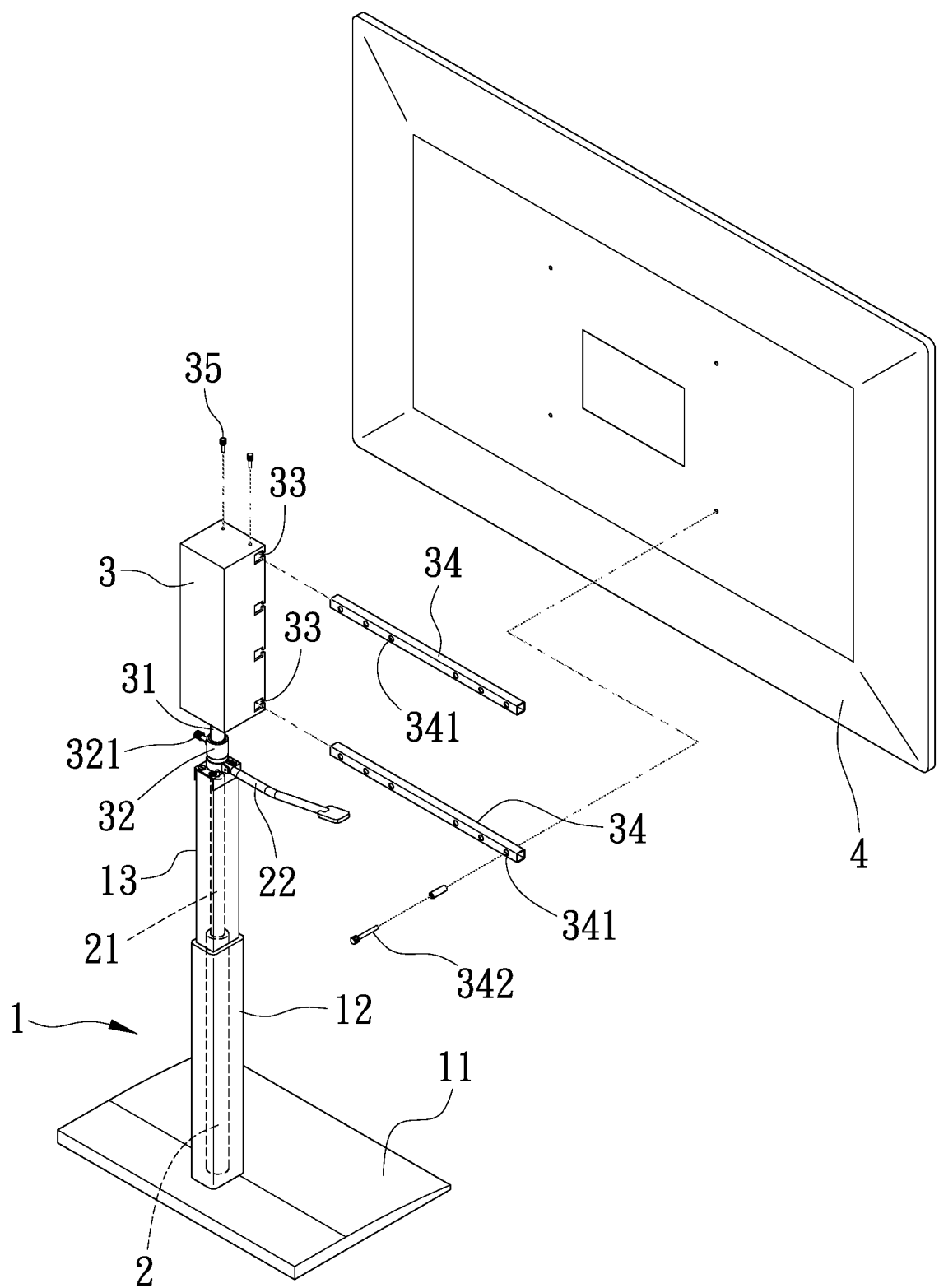
FIG. 1 is an exploded view of an embodiment according to the present invention.
Figure 2:
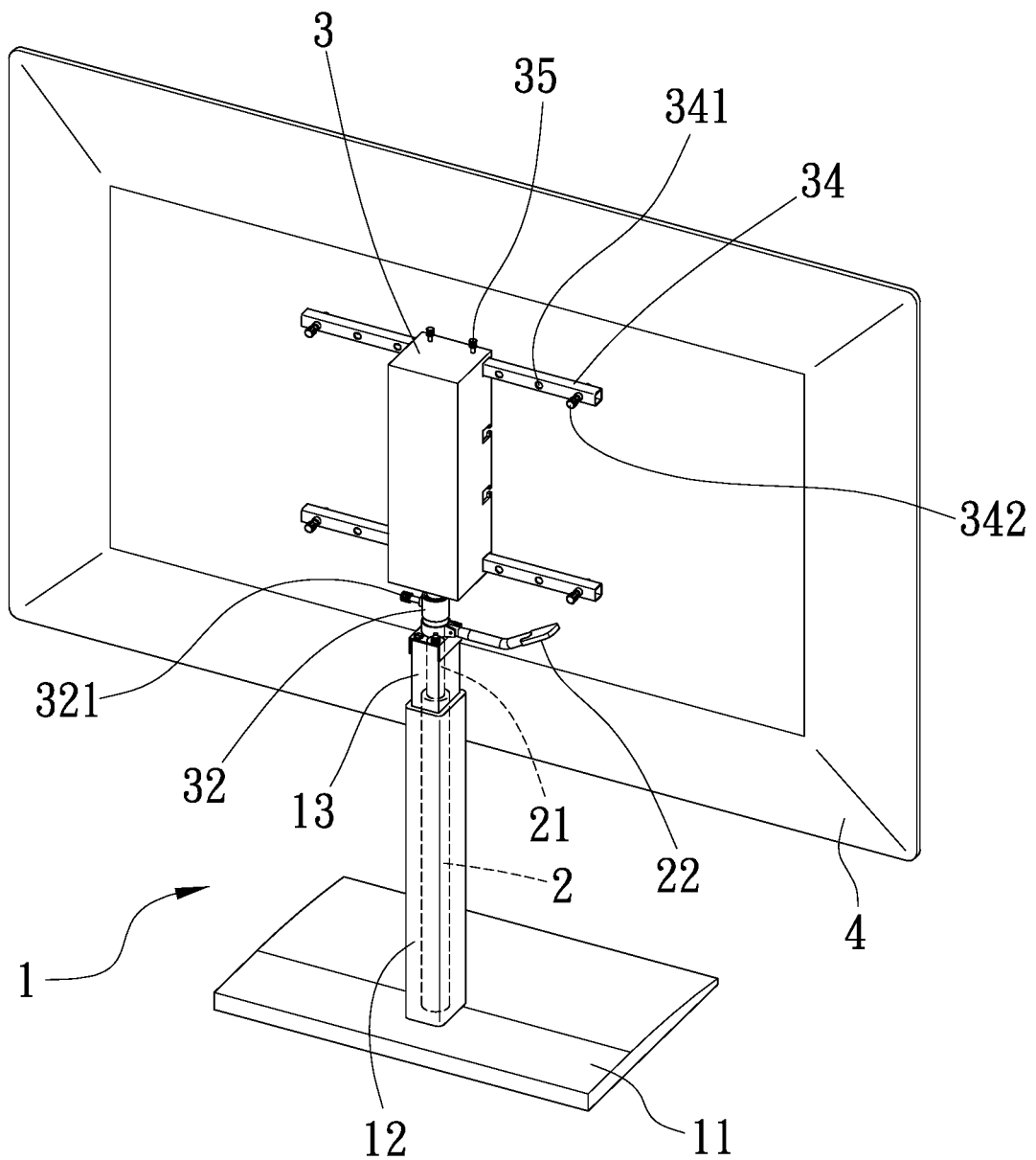
FIG. 2 is a perspective view of an embodiment according to the present invention.
Figure 3:
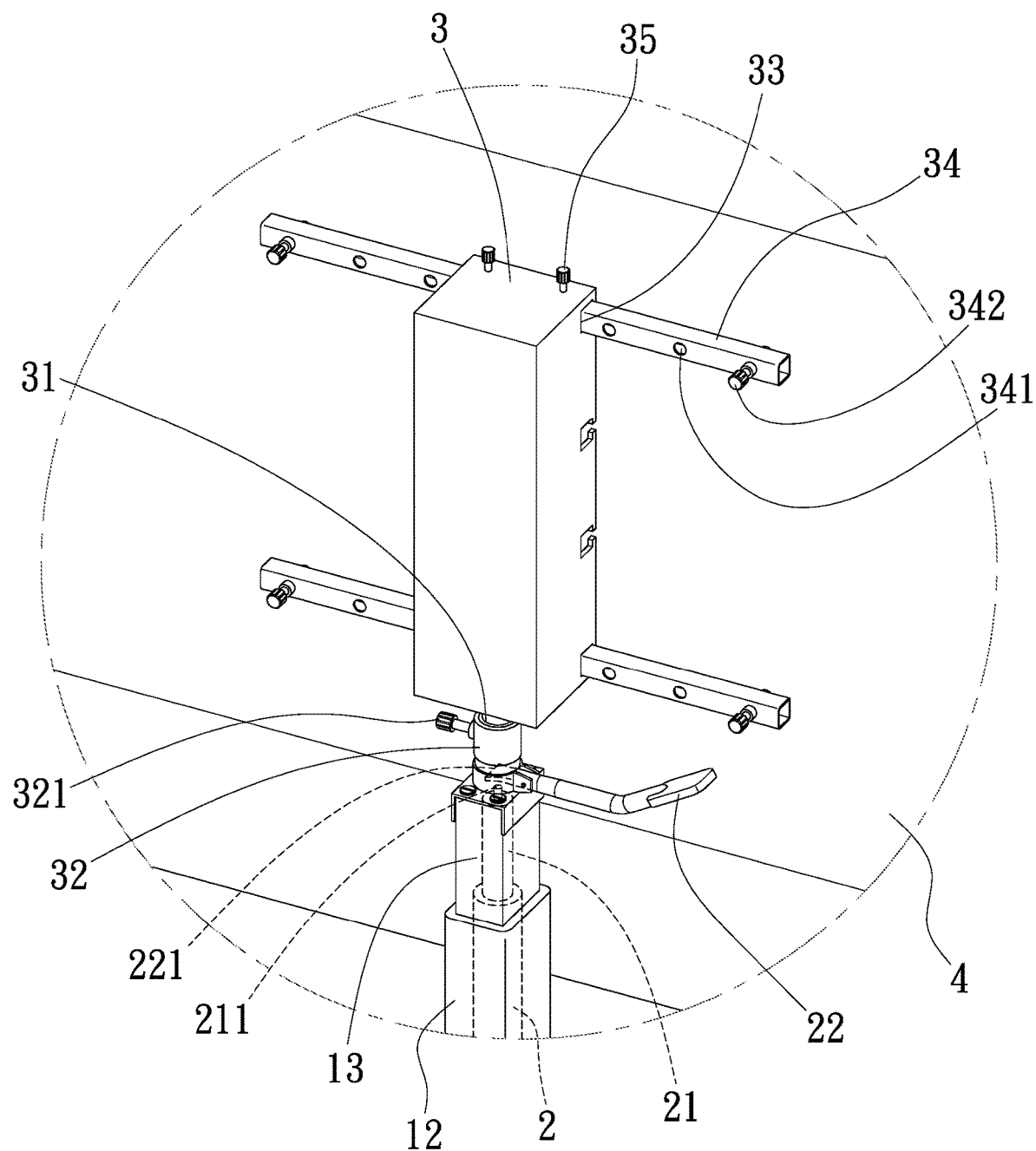
FIG. 3 is a partial enlarged view of an embodiment according to the present invention.

Refer to FIG. 1, FIG. 2, and FIG. 3, a floor-standing television left and mount according to the present invention includes a support bracket 1, a cylinder 2 and an assembly bracket 3.

The support bracket 1 consists of a base 11 on a bottom thereof, an outer support tube 12 disposed on an upper end of the base 11, and an inner support tube 13 moveably mounted in the outer support tube 12.

Figure 4:
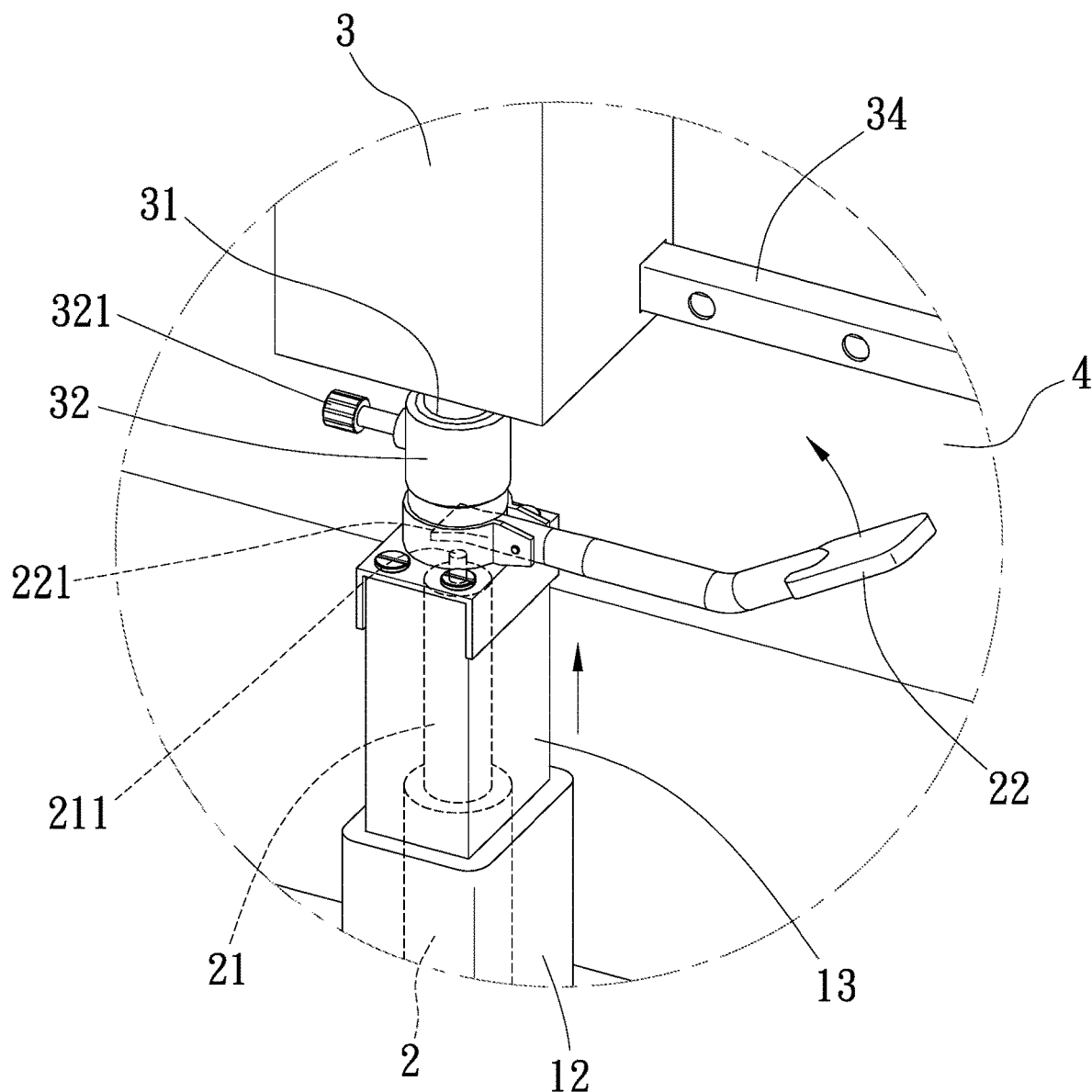
FIG. 4 is a partial enlarged view of a cylinder of an embodiment according to the present invention.

The cylinder 2 which is an air cylinder or a hydraulic cylinder is disposed in the outer support tube 12 of the support bracket 1 and a bottom of the cylinder 2 is fixed and connected with the base 11. The cylinder 2 is composed of an output shaft 21 having an upper end disposed and fixed on an upper end of the inner support tube 13, and a control member 22 arranged at the upper end of the inner support tube 13 and corresponding to the output shaft 21. A control part 211 is disposed on a top end of the output shaft 21 while the control member 22 is provided with a press part 221 corresponding to the control part 211 (as shown in FIG. 4). The control member 22 pushes the control part 211 to move by the press part 221 for control of movement of the output shaft 21 of the cylinder 2 while the output shaft 21 has a travel of 35 centimeters (cm) within which a height adjustment is performed.

The assembly bracket 3 includes a rotating shaft 31 disposed on a bottom thereof, a sleeve 32 by which the rotating shaft 31 is connected with a top end of the inner support tube 13 of the support bracket 1 for allowing the assembly bracket 3 to rotate 15 degrees around the rotating shaft 31 clockwise and counterclockwise, a plurality of assembly grooves 33 disposed on a front end of the assembly bracket 3, at least two assembly rods 34 mounted in the assembly grooves 33, and at least two positioning members 35 for positioning the assembly rods 34. The sleeve 32 is provided with a locking member 321 which is fastened and fixed on the inner support tube 13. Thereby the assembly bracket 3 is unable to be rotated anymore when the sleeve 32 is fastened and fixed on the inner support tube 13 by the locking member 321. Each of the assembly rods 34 is provided with a plurality of assembly holes 341 and a plurality of assembly members 342. Thereby positions of the assembly rods 34 are adjustable and the assembly rods 34 are mounted into the corresponding assembly grooves 33 according to a size of a television 4. By the assembly members 342 inserted through the assembly holes 341 correspondingly, the assembly rods 34 are fixed and connected with a back surface of the television 4. The positioning member 35 prevents the assembly rod 34 from sliding freely in the assembly groove 33.

Figure 5:
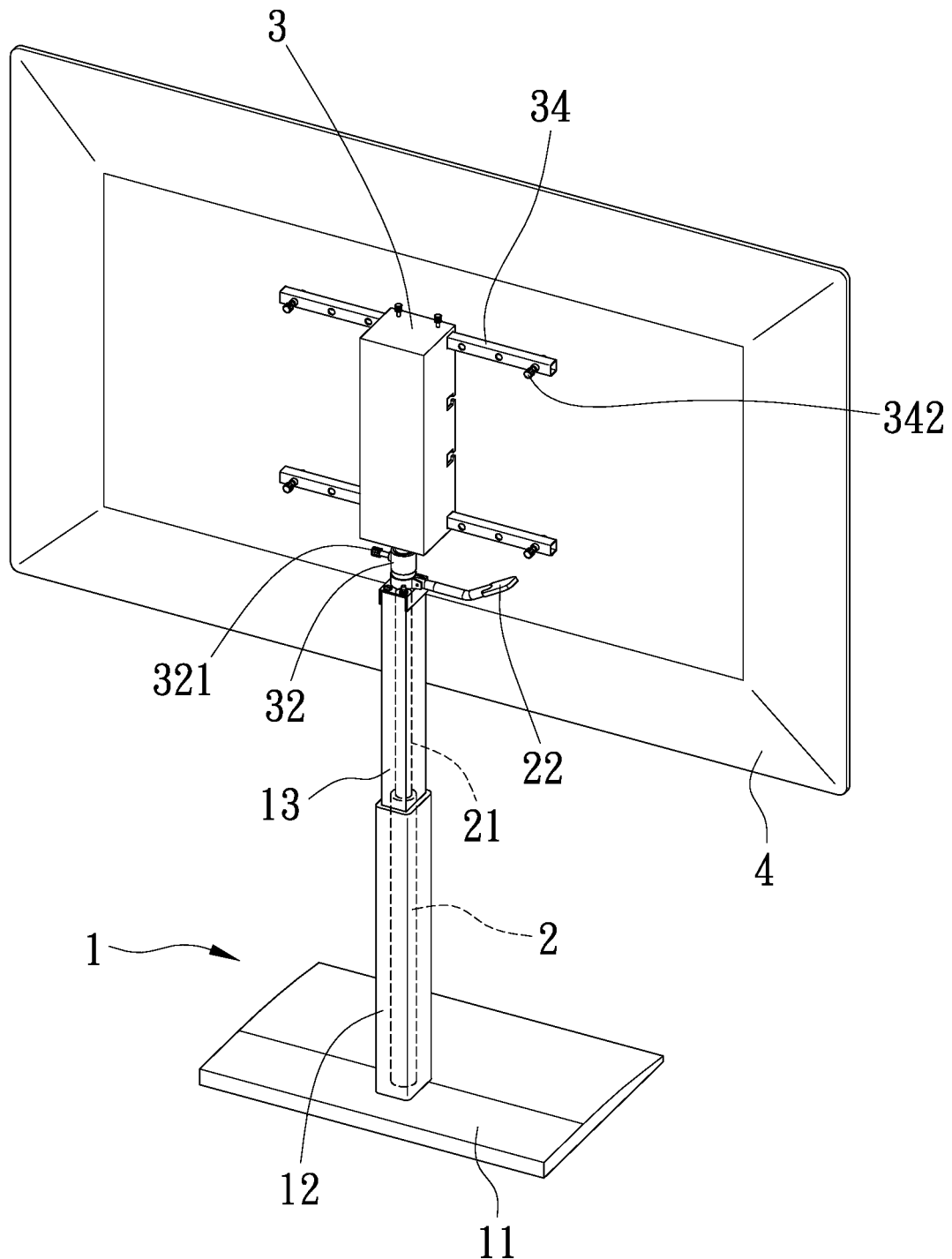
FIG. 5 is a schematic drawing showing height adjustment of an embodiment according to the present invention.
Figure 6:
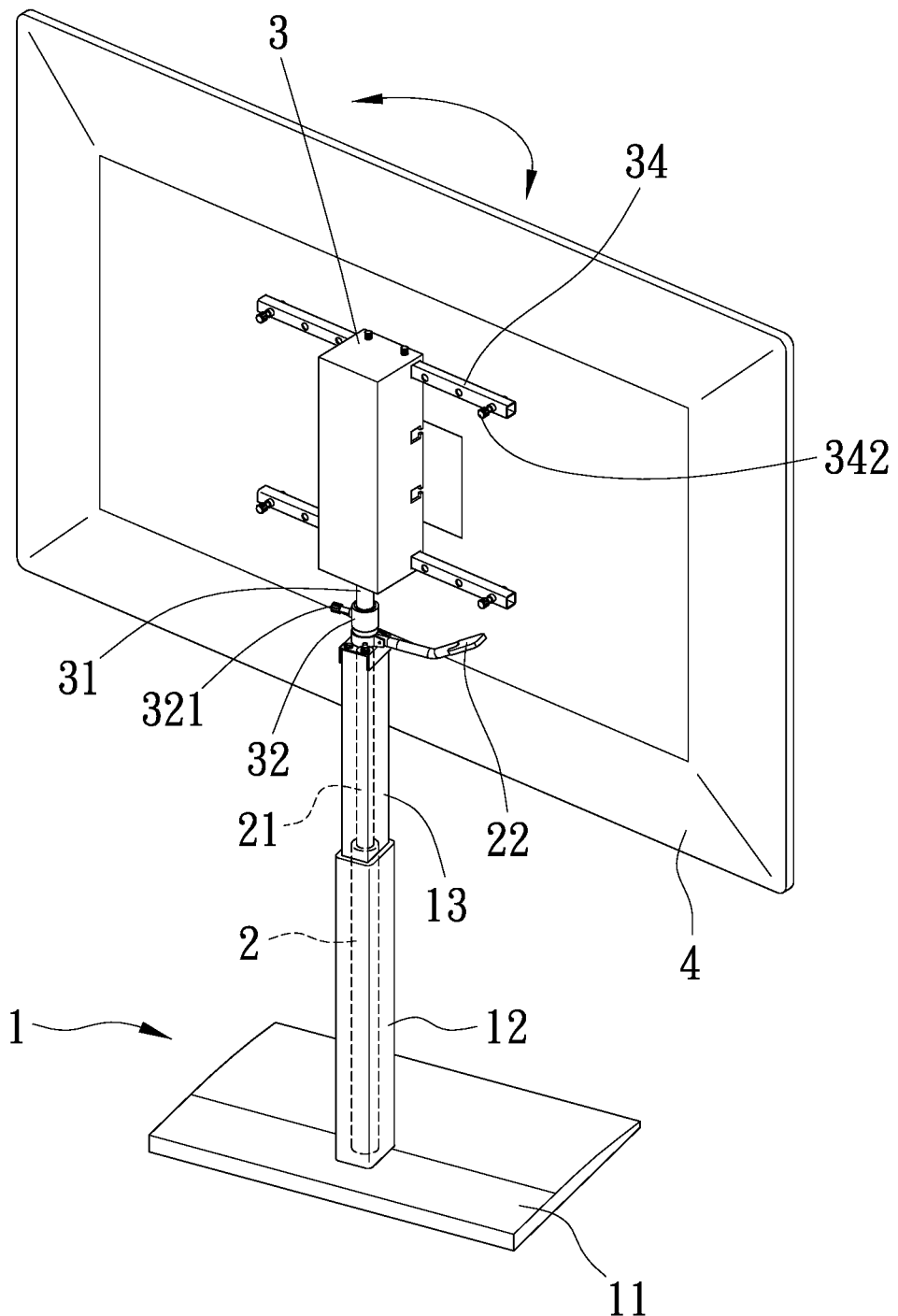
FIG. 6 is a schematic drawing showing adjustment of direction and angle of an embodiment according to the present invention.

While in use, the back surface of the television 4 is fixed and connected with the front end of the assembly bracket 3 by the assembly members 342 inserted through the assembly holes 341 of the assembly rods 34 and connected with the back surface of the television 4. Then users pull the control member 22 of the cylinder 2 so that the press part 221 presses the control part 211 down. Now the output shaft 21 drives the inner support tube 13 of the support bracket 1 together with the assembly bracket 3 and the television 4 to move under control of the control member 22, as shown in FIG. 5. Thus the users can adjust the television 4 to a height required according to their needs. Next release the control member 22 and the television 4 is positioned at the required height firmly. Moreover, the users can also rotate the television 4 so that the television 4 together with the assembly bracket 3 is rotated around the rotating shaft 31 clockwise or counterclockwise, as shown in FIG. 6. After the television 4 being rotated to optimal reviewing angle/direction, the assembly bracket 3 and the television 4 are unable to be rotated anymore by the locking member 321 of the sleeve 32 being fastened with the inner support tube 13.

In summary, the liftable television floor stand according to the present invention has the following advantages.

1. The output shaft of the cylinder is used to drive the assembly bracket together with the television to move upward and downward for being adjusted to a required height. No additional tools are needed during height adjustment. The required height is obtained quickly and conveniently in a stepless manner.
2. The television together with the assembly bracket can be rotated around the rotating shaft clockwise and counterclockwise. Thereby users can adjust the television to optimal viewing angle/direction according to their needs. The liftable television floor stand is more convenient to use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A liftable television floor stand comprising a support bracket, a cylinder, and an assembly bracket;
    wherein the support bracket is provided with a base on a bottom thereof, an outer support tube disposed on an upper end of the base, and an inner support tube moveably mounted in the outer support tube;
    wherein the cylinder is disposed inside the outer support tube of the support bracket and a bottom of the cylinder is fixed and connected with the base; wherein the cylinder is composed of an output shaft having an upper end disposed and fixed on an upper end of the inner support tube, and a control member arranged at the upper end of the inner support tube and corresponding to the output shaft; a control part is mounted on a top end of the output shaft while the control member is provided with a press part corresponding to the control part;
    the control member pushes the control part to move by the press part for control of movement of the output shaft of the cylinder;
    wherein the assembly bracket includes a rotating shaft disposed on a bottom thereof, a sleeve by which the rotating shaft is connected with a top end of the inner support tube of the support bracket for allowing the assembly bracket to rotate around the rotating shaft, a plurality of assembly grooves disposed on a front end of the assembly bracket, at least two assembly rods mounted in the assembly grooves correspondingly, and at least two positioning members for positioning the assembly rods; wherein the sleeve is provided with a locking member which is fastened with the inner support tube of the support bracket to keep the assembly bracket from rotation when the sleeve is fastened with the inner support tube by the locking member; wherein each of the assembly rods is provided with a plurality of assembly holes and a plurality of assembly members; positions of the assembly rods are adjustable and the assembly rods are mounted into the corresponding assembly grooves according to a size of a television; the assembly rods are fixed and connected with a back surface of the television by the assembly members inserted through the assembly holes correspondingly; wherein the positioning member prevents the assembly rod from sliding freely in the assembly groove.

2. The liftable television floor stand as claimed in claim 1, wherein the cylinder is an air cylinder.

3. The liftable television floor stand as claimed in claim 1, wherein the cylinder is a hydraulic cylinder.

4. The liftable television floor stand as claimed in claim 1, wherein the output shaft of the cylinder has a travel of 35 centimeters within which a height adjustment is performed.

5. The liftable television floor stand as claimed in claim 1, wherein the assembly bracket is able to be rotated 15 degrees around the rotating shaft clockwise and counterclockwise.

* * * * *